Aug. 7, 1956
J. T. KRAPP
2,757,944
SELF-VENTING SEPARABLE COUPLING
Filed Aug. 20, 1952
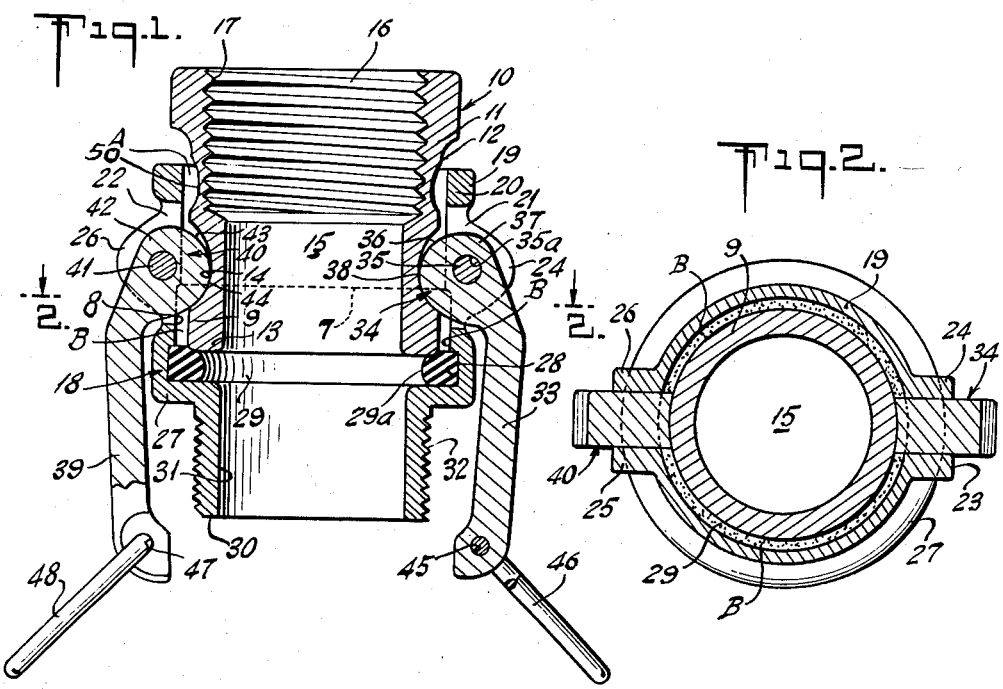
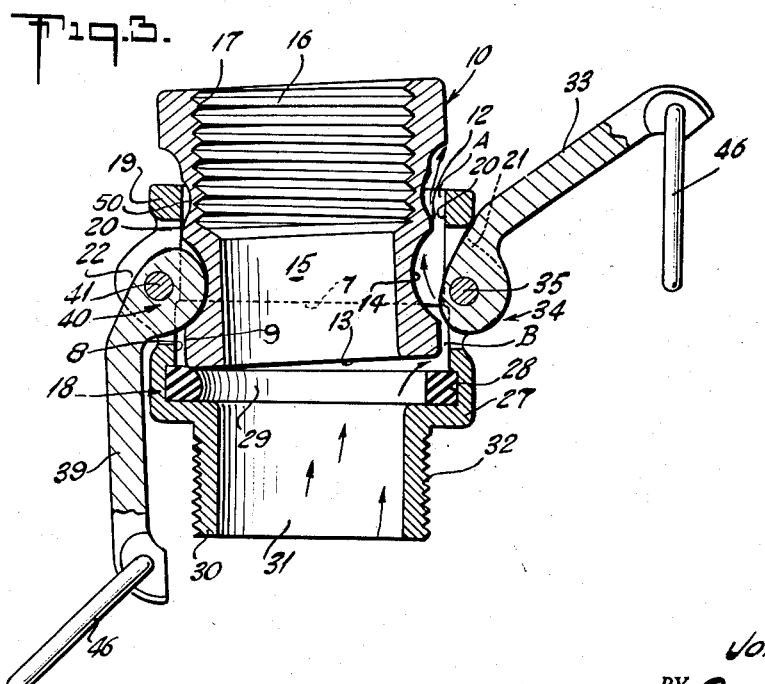
INVENTOR.
JOHN T. KRAPP
BY
*J. A. Grier*
ATTORNEY

United States Patent Office 2,757,944
Patented Aug. 7, 1956

2,757,944

SELF-VENTING SEPARABLE COUPLING

John T. Krapp, Port Washington, N. Y.

Application August 20, 1952, Serial No. 305,395

1 Claim. (Cl. 285—153)

This invention relates to improvements in coupling devices suitable for coupling hose, conduits and the like, and has for an object the provision of a quickly attachable and quickly detachable coupling, which employs in a socket member opposed cam means having surfaces adapted to be engaged by an insertable member as said insertable member is inserted for clearing a passage for the latter, and having other surfaces which engage said insertable member and which may be manipulated to force it endwise therein against a seat in said socket member to effect a fluid tight seal therewith, and means to vent a system containing said members without separating them.

A further object of the invention is to provide a quickly attachable and quickly detachable coupling which includes a female or socket member carrying a seat with sealing means thereon and increased clearance therein adjacent to the latter, an insertable or male member having an annular surface adapted to be engaged by cam means in said socket member, said male member having increased clearance thereon above said annular surface, said cam means being adapted to be manipulated for forcing said male member endwise against said seat, said cam means being first engaged by said male member when the latter is inserted and displaced from the path thereof, and having other portions of its surface adapted to engage said annular surface formed in said male member to effect said endwise movement and thereby establish a fluid tight seal between said members, said cams being so formed that the disengagement of one of them from said annular surface permits the male member to move about the point of contact with the other cam as a fulcrum due to the increased clearances described, thereby allowing some of the end portion of said male member to leave said sealing means and vent the system to which said coupling is connected.

Other objects and advantages of the invention will be apparent to those skilled in the art from a study of the following specification and the accompanying drawings.

In the drawings, which are merely given by way of example to illustrate the invention:

Figure 1 is a sectional elevation of my new and improved coupling showing the two members engaged in fluid tight relation;

Figure 2 is a sectional view, taken along the line 2—2 of Figure 1; and

Figure 3 is a view similar to Figure 1, with one of the cam levers raised, to a venting position.

Referring to Figures 1 and 2, a male or plug member 10 has a body portion 11 which may have a polygonal exterior and a portion 12 which constitutes the male or plug portion of said member. The plug portion 12 has its lower end 13 chamfered, the purpose of which will be presently described. Spaced apart from the lower end thereof, the plug portion 12 has a curved annular groove 14 formed therein, and this groove is adapted to be engaged by and to cooperate with camming means, which will presently be described. The portion 9 of the male member between the annular groove 14 and the end 13 is of a diameter to provide clearance, while the diameter of the portion 12 is substantially less than that of the portion 9, so that the member may be tilted or tipped in a manner to be presently described. A concentric passage 15 is formed in the member 10 and forms a fluid passage therethrough. The upper end 16 of member 10 is counterbored to join the passage 15 and is provided with threads 17 or any other suitable means to be used for connecting the member 10 to a hose or other conduit, either flexible or rigid, leading to a point of use.

Formed on the plug portion 12 in spaced relation to the annular groove 14 is an annular groove 50 which facilitates the tilting or tipping of the member 10 as hereinafter described.

The female or socket member, generally designated by the numeral 18, has a body portion 19 with a passage 20 formed therein, the inside diameter of which is slightly larger than the diameter of the plug portion 9.

By making the passage slightly larger than the plug portion 9, the chances of binding when the plug member is inserted therein is eliminated, particularly in view of the fact that the plug portion has a chamfered end 13 formed thereon. Oppositely disposed in the passage 20 are slots 21 and 22 which communicate with the interior thereof. The edges of the slot 21 are contiguous with the inner edges of spaced bosses or lugs 23 and 24, and the edges of the slot 22 are contiguous with the inner edges of spaced bosses or lugs 25 and 26.

The body 19 has an annular portion 27 which is larger in diameter and which has an annular groove 28 formed therein. The annular groove 28 is under-cut and has mounted therein an annular sealing ring 29, which forms a seat at the lower end of the passage 20, formed in the body 19. The passage 20 joins a portion 8 of larger inside diameter extending from the groove 28 to a shoulder 7, thereby providing increased clearance for the portion 9 of the male member. Below the annular portion 27, the body has a portion 30 of reduced diameter with a passage 31 formed therein, which is substantially the same diameter as and concentric with the passage 15 in the member 10. The exterior of the portion 31 may, for example, carry threads 32 adapted to be engaged by a fitting on any rigid or flexible conduit leading to a point of use. The lever 33 has its upper end in the form of a boss 34, and a pin 35 forms a working fit in a hole 35a formed therein. This pin also extends through aligned holes formed in the lugs 23 and 24. The surface of the boss includes a curvilinear portion 36 with a flattening or clearance portion 37 on one side thereof and a camming portion 38 on the opposite side thereof. The action of these surfaces of the boss 34 which forms a camming member will be presently described. A lever 39 is substantially identical with the lever 33 and it has a boss 40 formed on the upper end thereof, like the boss 34 on the lever 33. A pin 41 extends through aligned holes formed in the lugs 25 and 26 and forms a bearing for the lever 39. The boss 40 has a surface 42 corresponding to the surface 37, a surface 43 corresponding to the surface 36, and a camming surface 44 corresponding to the surface 38. The lower end of the lever 33 has a hole 45 formed therein to accommodate a ring 46. Likewise, the lower end of the lever 39 has a hole 47 therethrough to accommodate a ring 48.

The positions of the members 10 and 18, when said members are coupled together, is like that shown in Figure 1. It will be noted that the gasket 29, due to the axial pressure of the male or plug portion 12 against the gasket 29, causes it to bulge inwardly, as shown at 29a, and thereby effect a fluid tight seal between the two members 10 and 18. The levers 33 and 39 are shown as moved to positions where they exert the maximum axial pressure on the annular curved surface 14 of the plug portion 12. The camming surfaces 38 and 44 acting against the curvilinear surfaces have effected the forcing axially of the end of the portion 12 against the gasket 29. The rings 46 and 48 are provided to enable on operator to easily move the lever 33 counter-clockwise and the lever 39 clockwise to release the male or plug portion of the member 10.

When the two members of the coupling have been separated and it is desired to re-associate them in fluid tight relation, first the end of the plug member 12 is inserted into the bore 20 of the body 19 and pressed axially toward the bottom of the socket in the member 18. The chamfered edge 13 first encounters the rounded portions 36 and 43 on the cams 34 and 40 so that further movement of the member 10 causes the lever 33 to swing upwardly in a counter-clockwise direction. Still further movement causes the diameter of the lower end of the portion 12 to come between the flat surfaces 37 and 42 of these cams. Further movement downwardly is freely effected due to the fact that the end of the member is between the substantially parallel flat surfaces 37 and 42.

As the member 10 is moved downwardly toward the seat, the levers remain in their greatest position of upward movement as long as the diameter of the portion 12 is between the flat portions 37 and 42. As the lower end of the portion 12 approaches the gasket 29, the rounded portions 38 and 44 engage the curved surface 14 on the member 12, following which the levers may be manually swung downwardly, that is to say, the lever 33 is swung downwardly in a clockwise direction and the lever 39 is swung downwardly in a counter-clockwise direction, and as they are swung downwardly, the camming action of the surfaces 38 and 44 against the curvilinear surface 14 on the plug member 12, forces the member 12 axially or downwardly against the gasket 29, and as the levers approach their lowest positions, the gasket is compressed and deformed inwardly, as shown at 29a and thereby a fluid tight seal is established between the lower end of the plug portion 12 and the gasket 29.

When the members 10 and 18 are assembled and are forced into fluid tight relation by means of the cams 34 and 40 forcing the sealing face 13 of the member 10 into tractile engagement with the gasket 29, there is an extra clearance space "A" between the inner wall 20 and the outer wall 12; and there is an extra clearance space "B" between the inner wall 8 and the outer wall 9. These extra clearance spaces are provided so that the member 10 can be tilted or tipped within the socket portion of the member 18.

Now, assuming that the coupling has the member 10 connected to a closed system, and assuming that the member 18 is connected to a continuation of the closed system or to a second closed system, and that the two members are secured together in fluid tight relation by means of the cams 34 and 40 urging the seating face 13 against the gasket 29 to effect a fluid tight seal, the relation shown in Figure 1, in more instances than not there is either pressure or a partial vacuum in the closed system. Before separating the coupling members it is desirable to vent the system, or it might be desirable to bleed the pressure in the system down without having the separation of the members in mind.

In order to vent or bleed pressure from the system it is only necessary to raise one of the levers, the lever 33 for example, without disturbing the lever 39; with the result that the cam 40 on the lever 39 retains part of the face 13 in contact with the gasket 29. The remainder of the face 13 leaves the gasket 29 when the male member is tilted, thereby providing an opening between the remainder of the gasket 29 via which the pressure may escape from the system.

If it is not desired to separate the coupling members, the lever 39 is undisturbed, and the lever 33 may be swung downwardly whenever it is desired to close the system again.

On the other hand, if the members are to be separated, the lever 39 may be raised, thereby freeing the members so that they may be disengaged.

Although I have herein shown and described by way of example one embodiment of my new and improved venting coupling, it is obvious that many changes may be made in the arrangements herein shown and described without departing from the scope of the following claim.

What is claimed is:

In a combination separable coupling and venting device, a tubular male member having a connection end and having a seating face on the opposite end thereof, an annular engageable surface formed on said member in spaced apart relation to said seating face, an annular groove formed on said member in spaced apart relation to said annular engaging surface, a female member having a hollow tubular wall portion and having an internal shoulder therein, a gasket on said shoulder adapted to be engaged by said seating face, opposed levers pivotally mounted in slots formed in said wall portion, individual cam means on each lever extending through said slots and oppositely engaging said annular engageable surface for forcing said seating face into tractile engagement with said gasket and thereby effecting a fluid tight seal between said members, the inner diameter of said hollow annular wall being sufficiently greater than the outer diameter of said male member to provide a substantial annular clearance space between the inner surface of said hollow tubular wall portion and the outer surface of said tubular male member which is augmented by said annular groove, said clearance space and said annular groove being collectively of greater width adjacent to said first end of said male member than the width midway its length, whereby one of said levers may be moved in a direction to disengage its cam means from annular engaging surface without disturbing the other lever and its cam means, thereby permitting said male member to tilt within said hollow tubular wall portion under restraint of said last mentioned cam means and vent a system in which said coupling device is installed.

References Cited in the file of this patent

UNITED STATES PATENTS

| | | |
|---|---|---|
| 2,478,586 | Krapp | Aug. 9, 1949 |
| 2,518,026 | Krapp | Aug. 8, 1950 |
| 2,602,685 | Martinet et al. | July 8, 1952 |